(12) United States Patent
Zou

(10) Patent No.: US 8,736,242 B2
(45) Date of Patent: May 27, 2014

(54) BUCK CIRCUIT

(75) Inventor: Teng-Feng Zou, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 223 days.

(21) Appl. No.: 13/402,936

(22) Filed: Feb. 23, 2012

(65) Prior Publication Data

US 2013/0163293 A1 Jun. 27, 2013

(30) Foreign Application Priority Data

Dec. 27, 2011 (TW) .............................. 100149031 A

(51) Int. Cl.
*H02M 1/088* (2006.01)
(52) U.S. Cl.
USPC ........................................ 323/272; 323/282
(58) Field of Classification Search
CPC ............ H02M 2001/0051; H02M 2001/0054; H02M 2001/0041; H02M 1/088; H02M 3/1588; H02M 2001/0032

USPC .......................................... 323/272, 271, 282
See application file for complete search history.

(56) References Cited

U.S. PATENT DOCUMENTS

| | | | |
|---|---|---|---|
| 6,441,598 B1 * | 8/2002 | Ivanov | 323/284 |
| 8,575,902 B1 * | 11/2013 | Wei et al. | 323/269 |
| 2010/0295521 A1 * | 11/2010 | Odaohhara | 323/282 |

* cited by examiner

Primary Examiner — Harry Behm
(74) Attorney, Agent, or Firm — Novak Druce Connolly Bove + Quigg LLP

(57) ABSTRACT

A buck circuit of a computer includes a voltage input terminal, a voltage output terminal, first and second electronic switches, and first to third field effect transistors (FETs). When the computer is powered on, the signal control terminal of the computer outputs a first control signal to control the first FET to be turned on through the first and second electronic switches, and simultaneously controls the first and third FETs with a pulse width modulation (PWM) control chip. After the computer is powered off, the signal control terminal of the computer outputs a second control signal to control the first FET to be turned off through the first and second electronic switches, and to control the third FET through the PWM control chip.

6 Claims, 1 Drawing Sheet

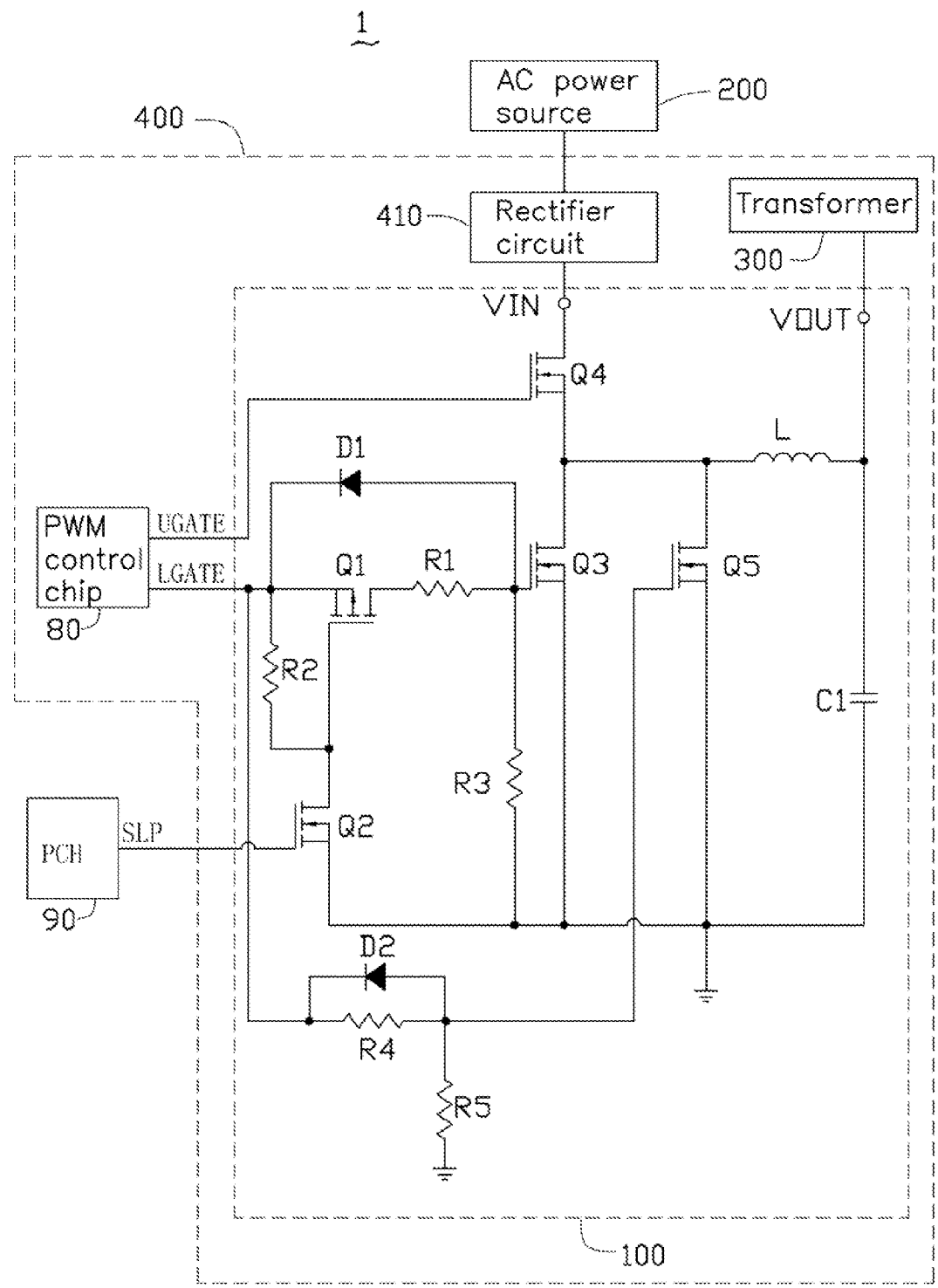

BUCK CIRCUIT

BACKGROUND

1. Technical Field

The present disclosure relates to a buck circuit.

2. Description of Related Art

In general, when a computer is powered on, two field effect transistors (FETs) of a buck circuit of the power supply are controlled to operate simultaneously by a pulse width modulation (PWM) control chip, to improve efficiency. However, after the computer is powered off, the FETs of the buck circuit still operate, which wastes energy. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of a buck circuit in accordance with an exemplary embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

Referring to the FIGURE, a buck circuit 100 is arranged inside a power supply 400 of a computer 1. The buck circuit 100 in accordance with an exemplary embodiment includes a voltage input terminal VIN, a voltage output terminal VOUT, two electronic switches, such as field effect transistors (FETs) Q1-Q2, FETs Q3-Q5, diodes D1 and D2, resistors R1-R5, an inductor L, and a capacitor C1. The voltage input terminal VIN is connected to an alternating current (AC) power source 200 through a rectifier circuit 410 of the power supply 400. The rectifier circuit 410 receives a AC power from the AC power source 200, and converts the AC power to a DC power which is provided to the buck circuit 100. The voltage output terminal VOUT is connected to a transformer 300 of the power supply 400.

A gate of the FET Q1 is connected to a drain of the FET Q2. A source of the FET Q1 is connected to a signal pin LGATE of a pulse width modulation (PWM) control chip 80. A drain of the FET Q1 is connected to a gate of the FET Q3 through the resistor R1. A gate of the FET Q2 is connected to a signal pin SLP of a PLATFORM CONTROLLER HUB (PCH) 90. A drain of the FET Q2 is connected to the source of the FET Q1 through the resistor R2. A source of the FET Q2 is grounded. The gate of the FET Q3 is grounded through the resistor R3 and also connected to an anode of the diode D1. A cathode of the diode D1 is connected to the source of the FET Q1. A drain of the FET Q3 is connected to a source of the FET Q4. A source of the FET Q3 is grounded. A gate of the FET Q4 is connected to a signal pin UGATE of the PWM control chip 80. A drain of the FET Q4 is connected to the voltage input terminal VIN. A gate of the FET Q5 is connected to the signal pin LGATE of the PWM control chip 80 through the resistor R4 and also grounded through the resistor R5. A cathode of the diode D2 is connected to the signal pin LGATE of the PWM control chip 80, and an anode of the diode D2 is connected to the gate of the FET Q5. A drain of the FET Q5 is connected to the source of the FET Q4, and also connected to the voltage output terminal VOUT through the inductor L. The capacitor C1 is connected between the voltage output terminal VOUT and ground. In one embodiment, the FET Q1 is a p-channel FET. The FETs Q2-Q5 are n-channel FETs.

When the computer 1 is powered on, the signal pin SLP of the PCH 90 outputs a high level signal to the gate of the FET Q2, the FET Q2 is turned on. The drain of the FET Q2 outputs a low level signal to the gate of the FET Q1, the FET Q1 is turned on. The signal pin LGATE of the PWM control chip 80 outputs a low level signal to the gates of the FETs Q3 and Q5, the FETs Q3 and Q5 are turned off. The signal pin UGATE of the PWM control chip 80 outputs a high level signal to the gate of the FET Q4, the FET Q4 is turned on. The rectifier circuit 410 received AC power from the AC power source 200 and converts the AC power to a DC power which is provided to the transformer 300 through the voltage input terminal VIN, the FET Q4, the inductor L for filtering, and the voltage output terminal VOUT, and also charges the capacitor C1. When the signal pin UGATE of the PWM control chip 80 outputs a low level signal to the gate of the FET Q4, the FET Q4 is turned off. The signal pin LGATE of the PWM control chip 80 outputs a high level signal to the gates of the FETs Q3 and Q5, the FETs Q3 and Q5 are turned on. The capacitor C1 discharges through the inductor L and the FETs Q3 and Q5 and provides the discharging voltage to the transformer 300 through the voltage output terminal VOUT. Namely, the FETs Q3 and Q5 are controlled simultaneously by the PWM control chip 80 when the computer 1 is powered on, to improve efficiency.

After the computer 1 is powered off, the signal pin SLP of the PCH 90 outputs a low level signal to the gate of the FET Q2, the FET Q2 is turned off. The gate of the FET Q1 does not receive a level signal and is turned off. The gate of the FET Q3 does not receive a level signal and is turned off. When the signal pin LGATE of the PWM control chip 80 outputs a low level signal to the gate of the FET Q5, the FET Q5 is turned off. The signal pin UGATE of the PWM control chip 80 outputs a high level signal to the gate of the FET Q4, the FET Q4 is turned on. The rectifier circuit 410 receives a AC power from the AC power source 200 and converts to DC power and provides to the transformer 300 through the voltage input terminal VIN, the FET Q4, the inductor L for filtering, and the voltage output terminal VOUT, and also charges the capacitor C1. When the signal pin UGATE of the PWM control chip 80 outputs a low level signal to the gate of the FET Q4, the FET Q4 is turned off. The signal pin LGATE of the PWM control chip 80 outputs a high level signal to the FET Q5, the FET Q5 is turned on. The capacitor C1 discharges through the inductor L and the FET Q5 and provides the discharging voltage to the transformer 300 through the voltage output terminal VOUT. Namely, the FET Q3 is turned off and the FET Q5 is controlled by the PWM control chip 80 after the computer 1 is powered off, to save energy.

The buck circuit 100 can control the FETs Q3 and Q5 to operate simultaneously when the computer 1 is powered on for improving efficiency, and control the FET Q3 to be turned off and control the FET Q5 to operate when the computer 1 is powered off for saving energy.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A buck circuit applicable to a power supply of a computer, the buck circuit comprising:
- a voltage input terminal to receive a voltage from an alternating current (AC) power source through a rectifier circuit of the power supply;
- a voltage output terminal to output a voltage to a transformer of the power supply;
- a first electronic switch comprising a first terminal connected to a first signal pin of a pulse width modulation (PWM) control chip, a second terminal, and a third terminal;
- a second electronic switch comprising a first terminal connected to a signal control terminal of the computer, a second terminal connected to the third terminal of the first electronic switch and also connected to the first terminal of the first electronic switch through a first resistor, and a third terminal grounded;
- a first field effect transistor (FET), wherein a gate of the first FET is connected to the second terminal of the first electronic switch and also grounded through a second resistor, a source of the first FET is grounded, a drain of the first FET is connected to the voltage output terminal through an inductor;
- a second FET, wherein a gate of the second FET is connected to a second signal pin of the PWM control chip, a drain of the second FET is connected to the voltage input terminal, a source of the second FET is connected to the drain of the first FET; and
- a third FET, wherein a gate of the third FET is connected to the first signal pin of the PWM control chip and also grounded through a third resistor, a drain of the third FET is connected to the drain of the first FET, a source of the third FET is grounded;
- wherein the signal control terminal of the computer outputs a high level signal in responding to the computer is powered on, and the signal control terminal of the computer outputs a low level signal in responding to the computer is power off;
- wherein the first electronic switch is turned on in responding to the third terminal of the first electronic switch receives a low level signal, and the first electronic switch is turned off in responding to the third terminal of the first electronic switch receives a high level signal; and
- wherein the second electronic switch is turned on in responding to the first terminal of the second electronic switch receives a high level signal, and the second electronic switch is turned off in responding to the first terminal of the second electronic switch receives a low level signal.

2. The buck circuit of claim 1, further comprising a first diode and a fourth resistor, wherein an anode of the first diode is connected to the gate of the first FET, a cathode of the first diode is connected to the first signal control terminal of the PWM control chip, the fourth resistor is connected between the second terminal of the first electronic switch and the gate of the first FET.

3. The buck circuit of claim 2, further comprising a second diode and a fifth resistor, wherein an anode of the second diode is connected to the gate of the third FET, a cathode of the second diode is connected to the first signal pin of the PWM control chip, the fifth resistor is connected between the first signal pin of the PWM control chip and the gate of the third FET.

4. The buck circuit of claim 1, wherein the signal control terminal of the computer is a signal terminal of a PLATFORM CONTROLLER HUB (PCH) of the computer.

5. The buck circuit of claim 1, wherein the first electronic switch is a p-channel FET, the first to third terminals of the first electronic switch are respectively a source, a drain, and a gate of the FET.

6. The buck circuit of claim 1, wherein the second electronic switch is an n-channel FET, the first to third terminals of the second electronic switch are respectively a gate, a drain, and a source of the FET.

* * * * *